(12) United States Patent
Tatsu (10) Patent No.: US 9,384,436 B2
(45) Date of Patent: Jul. 5, 2016

(54) CARD WITH BUILT-IN ELECTRONIC COMPONENT

(75) Inventor: Jintaro Tatsu, Ushiku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 293 days.

(21) Appl. No.: 13/991,843

(22) PCT Filed: Dec. 5, 2011

(86) PCT No.: PCT/JP2011/078058
§ 371 (c)(1),
(2), (4) Date: Sep. 26, 2013

(87) PCT Pub. No.: WO2012/077632
PCT Pub. Date: Jun. 14, 2012

(65) Prior Publication Data
US 2014/0016286 A1     Jan. 16, 2014

(30) Foreign Application Priority Data
Dec. 6, 2010   (JP) .................... 2010-271995

(51) Int. Cl.
*H05K 1/14*        (2006.01)
*G06K 19/077*    (2006.01)
(Continued)

(52) U.S. Cl.
CPC .............. *G06K 19/077* (2013.01); *B42D 25/00* (2014.10); *G06K 19/07345* (2013.01);
(Continued)

(58) Field of Classification Search
USPC .................... 361/728, 736, 737, 832, 679.01; 200/237, 238, 279, 292, 341, 513, 520, 200/530, 406
See application file for complete search history.

(56) References Cited

U.S. PATENT DOCUMENTS 5,399,823 A * 3/1995 McCusker .................... 200/521
5,950,808 A * 9/1999 Tanabe et al. ................ 200/314
(Continued)

FOREIGN PATENT DOCUMENTS

JP      2005-166609 A     6/2005
JP      2006012497 A      1/2006
(Continued)

OTHER PUBLICATIONS

Office Action dated Jul. 8, 2014 for Japanese Application No. 2013-201332.
(Continued)

*Primary Examiner* — Hung S Bui
(74) *Attorney, Agent, or Firm* — Locke Lord LLP; James E. Armstrong, IV; Howard M. Gitten (57) ABSTRACT

Provided is a card with a built-in electronic component, which has a superior button click sensation. A card of the present invention into which is built-in a module substrate upon which an electronic component has been disposed is provided with: a front cover sheet stacked upon a side above the module substrate; an adhesion layer adhering between the module substrate and the front cover sheet; and a dome switch which is disposed upon the module substrate, and by way of the card upper surface being pressed, the switch's movable portion deforms to the module substrate side so that the electrical contact comes into tactile contact with the module substrate in order to operate the card; wherein the switch's movable portion is such that the upper surface does not adhere to the adhesion layer and the deformation to the module substrate side is unrestrained with respect to the adhesion layer.

4 Claims, 9 Drawing Sheets

(51) Int. Cl.
*G06K 19/073* (2006.01)
*B42D 25/00* (2014.01)

(52) U.S. Cl.
CPC ... *G06K 19/07707* (2013.01); *G06K 19/07722* (2013.01); *B42D 2033/46* (2013.01); *H01H 2215/004* (2013.01); *H01H 2231/05* (2013.01)

(56) References Cited

U.S. PATENT DOCUMENTS

| | | | |
|---|---|---|---|
| 6,743,994 B2 * | 6/2004 | Adachi | 200/512 |
| 6,927,352 B2 * | 8/2005 | Bouche et al. | 200/512 |
| 6,982,394 B2 * | 1/2006 | Ide et al. | 200/516 |
| 7,075,020 B2 * | 7/2006 | Asada | 200/1 B |
| 7,075,025 B2 * | 7/2006 | Tomitsuka et al. | 200/512 |
| 7,230,197 B2 * | 6/2007 | Sano et al. | 200/406 |
| 7,897,889 B2 * | 3/2011 | Chikahisa et al. | 200/314 |
| 8,164,014 B2 * | 4/2012 | Tatehata et al. | 200/310 |
| 2008/0299860 A1 | 12/2008 | Lee et al. | |
| 2009/0294264 A1 * | 12/2009 | Chien et al. | 200/302.2 |

FOREIGN PATENT DOCUMENTS

| | | |
|---|---|---|
| JP | 2008-539473 A | 11/2008 |
| JP | 2008-299783 A | 12/2008 |
| JP | 2010-146947 A | 7/2010 |
| JP | 2010-186375 A | 8/2010 |
| JP | 2010-257422 A | 11/2010 |
| KR | 10-0798685 B1 | 1/2008 |
| WO | WO-2009048127 A1 | 4/2009 |

OTHER PUBLICATIONS

International Search Report of PCT/JP2011/078058.
Office Action issued to KR Application No. 10-2013-7015054, mailed Apr. 29, 2014.

* cited by examiner

CARD WITH BUILT-IN ELECTRONIC COMPONENT

CROSS-REFERENCE TO RELATED APPLICATIONS

This application is the national phase under 35 U.S.C. §371 of PCT International Application No. PCT/JP2011/078058 filed Dec. 5, 2011, which claims the benefit of Japanese Patent Application No. 2010-271995, filed Dec. 6, 2010, the entire contents of the aforementioned applications are hereby incorporated herein by reference.

TECHNICAL FIELD

The present invention relates to a card with a built-in electronic component into which a dome switch is incorporated.

BACKGROUND ART

In recent years, Internet banking or the like employs a random-number table that is distributed to a user, along with the issuance of a cash card, as an identification-verification tool to be used upon a change of password at the time of money withdrawal, for example.

There has also been proposed a one-time password-generating tool using an IC card as well as an IC card that allows one to check content recorded in an IC chip (refer to Patent Document 1, for example).

Figure 3:
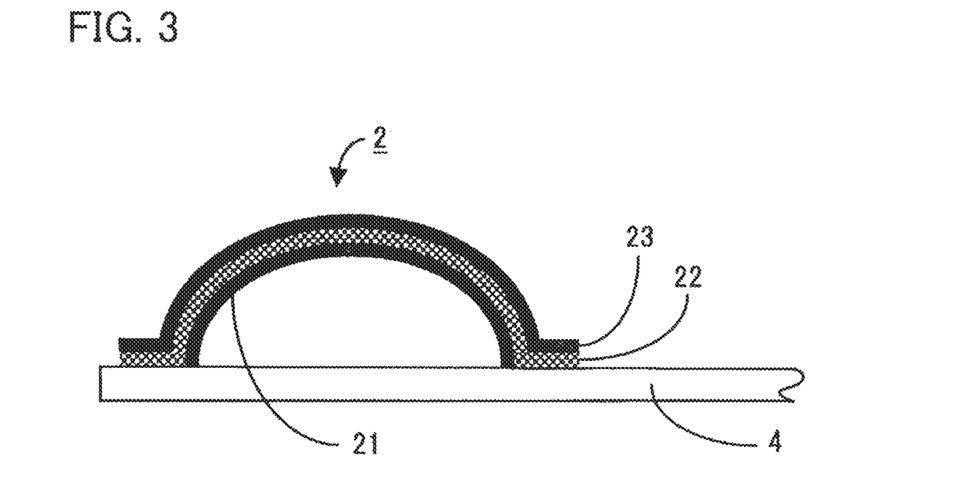
FIG. 3 is a diagram illustrating a conventional switch part.

On the other hand, a card has been proposed with a built-in display part into which a display unit or a power on/off switch for the display part is incorporated. A conventional power on/off switch as illustrated in FIG. 3 however includes an adhesive layer formed between a switch part 21 and a resin film layer 23 that is a cover member, whereby the click sensation obtained by depressing a switch 2 from a card surface has been unsatisfactory.

Patent Document 1: Japanese Unexamined Patent Application, Publication No. 2008-299783

DISCLOSURE OE THE INVENTION

Problems to be Solved by the Invention

An object of the present invention is to provide a card with a built-in electronic component that offers a superior button click sensation.

Means for Solving the Problems

The present invention solves the problem by the following means. Note that reference numerals corresponding to those in embodiments of the present invention will be provided in the description for the sake of better understanding, not of limiting the structure to these reference numerals. The structure described with the reference numerals may be improved as appropriate, and at least a part of the structure may be substituted by another component as well.

A first aspect of the present invention is provided with
a card with a built-in electronic component, where a card base includes therein an electrical component, a metal dome switch, and a control part that are formed on the same substrate. The card base has a laminate structure in which a front cover sheet, a core layer, and a back cover sheet are laminated sequentially. A display part is formed on an exposed surface side of the front cover sheet in order for display information of a display device to be displayed in a visually recognizable manner. The metal dome switch includes, from the inner side thereof, a switch part having a metal contact and a cover member covering the switch part, where a predetermined space is formed between the switch part and the cover member.

A second aspect of the present invention is provided with the card with a built-in electronic component as recited in the first aspect of the present invention, wherein the cover member includes a laminate of a resin film layer, an adhesive layer, and a resin film layer formed in order from the switch part side.

A third aspect of the present invention is provided with a card with a built-in electronic component into which an electrical substrate (211 and 411) on which an electronic component (212, 214, and 215) is disposed is incorporated. The card includes: an upper layer (221) laminated above the electrical substrate; an adhesion layer (224), which bonds the electrical substrate and the upper layer together; and a dome switch (231, 331, 431, and 531), which is disposed on the electrical substrate, has an electrical contact on the electrical substrate side, and operates the card when the electrical contact is brought into contact with the electrical substrate upon depression of the top surface of the card to deform a movable switch portion (231a and 531a) toward the electrical substrate side, the movable switch portion being a movable portion of the switch. The top surface of the movable switch portion is not bonded to the adhesion layer, so that the deformation of the movable switch portion toward the electrical substrate side is unrestrained by the adhesion layer.

A fourth aspect of the present invention is provided with the card with a built-in electronic component as recited in the third aspect of the present invention, the card including: a cover (232, 332, and 432), which is shaped to cover the dome switch (231, 331, and 431), is superposed on the dome switch, and includes a movable cover portion (231a) that is a movable portion of the cover deformed toward the electrical substrate (211 and 411) side upon depression of the top surface of the card; and a retainer (233, 333, and 433), which retains the cover onto the electrical substrate. At least part each of the cover and the retainer is bonded to the adhesion layer (224), whereas the movable switch portion (231a) is not bonded to the movable cover portion, so that the deformation of the movable switch portion toward the electrical substrate side is unrestrained by the movable cover portion.

A fifth aspect of the present invention is provided with the card with a built-in electronic component as recited in the fourth aspect of the present invention, wherein the cover (232) and the dome switch (231) are a common part in which two pieces of the dome switch are placed on top of each other.

A sixth aspect of the present invention is provided with an assembly which is incorporated into a card with a built-in electronic component. The assembly includes: an electrical substrate (211 and 411), on which an electronic component (212, 214, and 215) is disposed; a dome switch (231, 331, 431, and 531), which is disposed on the electrical substrate, has an electrical contact on the electrical substrate side, and operates the card when the electrical contact is brought into contact with the electrical substrate upon depression of the top surface of the card to deform a movable switch portion (231a and 531a) toward the electrical substrate side, the movable switch portion being a movable portion of the switch; a cover (232, 332, and 432), which is shaped to cover the dome switch, is superposed on the dome switch, and includes a movable cover portion that is a movable portion of the cover deformed toward the electrical substrate side upon depression of the top surface of the card; and a retainer (233, 333, and 433), which retains the cover on the electrical substrate. The movable switch portion is not bonded to the movable cover portion so that the deformation of the movable switch portion toward the electrical substrate side is unrestrained by the movable cover portion.

Effects of the Invention

The following effects can be attained according to the present invention.

According to the first aspect of the present invention, a superior click sensation can be obtained from the card with a built-in electronic component in which the dome switch within the card base can be operated comfortably from a card surface.

According to the second aspect of the present invention, the cover member is formed of a laminate of the resin film layer, the adhesive layer, and the resin film layer in order from the dome switch side, whereby the member including the adhesive layer and the resin film layer disposed on the side opposite to the switch part can retain the dome switch on the substrate through the resin film layer disposed on the switch part side. As a result, the dome switch can be temporarily fixed to the electrical substrate during manufacture of the card. After the card has been manufactured, the resin film layer disposed on the side opposite to the switch part is retained by a core layer, thereby controlling the misalignment of the dome switch relative to the substrate.

The following effects can be further attained according to the present invention.

According to the third aspect of the present invention, the deformation of the movable switch portion of the dome switch toward the electrical substrate side is unrestrained by the adhesion layer. When the top surface of the card is pressed down, the movable switch portion is deformed through the adhesion layer and, when deformed to a certain degree or more, is deformed toward the electrical substrate side regardless of the deformation of the adhesion layer. The dome switch can thus be deformed in accordance with the setting to provide a user with a superior click sensation.

Moreover, according to the third aspect of the present invention, durability in accordance with the setting can be obtained by operating the movable switch portion in accordance with the setting.

The desired performance of the dome switch can be exerted as a result according to the third aspect of the present invention.

According to the fourth aspect of the present invention, the cover is superposed on the dome switch while the retainer retains the cover on the electrical substrate, whereby the retainer can retain the dome switch on the electrical substrate through the cover. As a result, the dome switch can be temporarily fixed to the electrical substrate during manufacture of the card. In addition, at least part each of the cover and the retainer is bonded to the adhesion layer. The cover and the retainer can thus be securely bonded to the adhesion layer after the card has been manufactured, thereby controlling the misalignment of the dome switch relative to the electrical substrate.

Moreover, according to the fourth aspect of the present invention, the movable switch portion is not bonded to the movable cover portion, allowing the deformation of the movable switch portion toward the electrical substrate side to be unrestrained by the movable cover portion. As a result, the desired performance of the dome switch can be attained similarly to the third aspect of the present invention.

According to the fifth aspect of the present invention, the cover and the dome switch are a common part formed by placing two pieces of the dome switch on top of each other, whereby the two dome switches can be securely fixed and superposed onto each other. This allows the number of types of a component to be decreased, thereby facilitating the management of the component during manufacture or the like.

Effects similar to those of the first and the second aspects of the present invention can be attained according to the sixth aspect of the present invention.

BRIEF DESCRIPTION OF THE DRAWINGS

FIGS. 6A1 to 6B2 are diagrams including a plan view and a side view of an electronic module 210 and an external view of a card 220 according to a second embodiment.

EXPLANATION OF REFERENCE NUMERALS card with a built-in electronic component
2 switch
3 display device
4 substrate
5 battery
11 front cover sheet
12 back cover sheet
13 core layer
14 shield layer
21 switch part
22 adhesive layer
23 cover member
24 second resin film layer
30 display part 141 printed part
30a display information
210 electronic module
211, 411 module substrate
212 display part
214 battery
215 IC chip
220, 320, 420, 520 card
221 front cover sheet
221a window
222 back cover sheet
223 intermediate substrate
230, 330, 430, 530 button
231, 331, 431, 531 dome switch
231a, 531a movable switch portion
232, 332, 432 cover
232a movable cover portion
233, 333, 433 tape
431e leg
531f resin layer

PREFERRED MODE FOR CARRYING OUT THE INVENTION (First Embodiment)

An embodiment of a card with a built-in electronic component according to the present invention will be described with reference to FIGS. 1 and 2.

A card with a built-in electronic component 1 according to the present invention includes a display device 3, a battery 5, a power on/off switch 2, and a control part (not shown) that are formed on a same substrate 4 and incorporated into a card base.

The card base has a laminate structure in which a transparent front cover sheet 11, a core layer 13, and a back cover sheet 12 are sequentially laminated. A display part (window) 30 is formed on an exposed surface side of the front cover sheet 11 in order for display information 30a of the display device 3 to be displayed in a visually recognizable manner. A metal dome switch is used as the power on/off switch 2.

Figure 1:
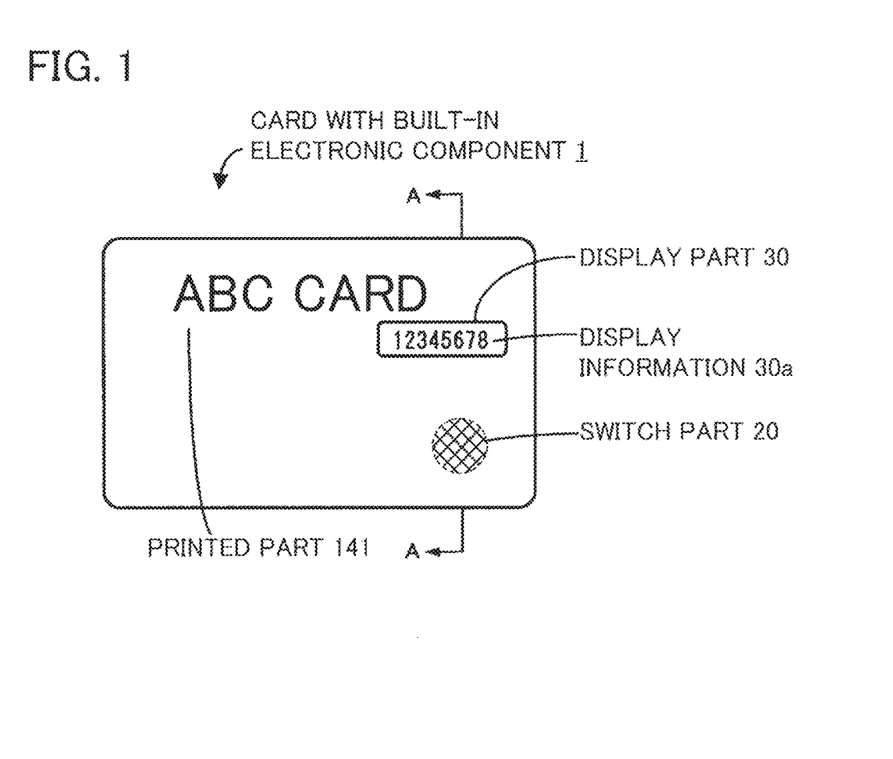
FIG. 1 is a diagram illustrating an embodiment of a card with a built-in electronic component according to the present invention.

Formed on the surface of the card with a built-in electronic component 1 as illustrated in FIG. 1 is a printed part 141 in which a card name such as "ABC card" is printed, and a panel (not shown) in which a cardholder name is indicated.

Although not shown, a magnetic record part is provided in some cases.

The display information 30a such as a password displayed in the display part of the built-in display device is displayed in the display part 30 and can be visually recognized from a card surface through the transparent front cover sheet provided on the card with a built-in electronic component 1.

The display part (window) 30 is formed by shielding the periphery of the window by printed matter or the like while leaving only the window part transparent.

The built-in display device cannot be visually recognized since the entire surface of the card base except the display part 30 is shielded as described above.

The power on/off switch which constantly displays a new password by turning the power on/off is built into the card base below the display part 30.

The position of the built-in power on/off switch can be displayed on the surface of the shield layer as a switch 20 indicated by a printed pattern.

When the card with a built-in electronic component 1 is a cash card from a bank, the card is inserted into the card-insertion slot of a cash dispenser or an ATM with the surface of the card on which the magnetic record part is formed facing up.

When the card with a built-in electronic component 1 is a credit card, the card is also inserted into a card-insertion slot of a storefront terminal with the front surface of the card facing up.

A cross section taken along line A-A in FIG. 1 will be described in detail with reference to FIG. 2.

The transparent front cover sheet 11 and the back cover sheet 12 are laminated on the front and the back sides of the core layer 13 of the card with a built-in electronic component of the present embodiment, respectively.

The back cover sheet 12 may be entirely shielded by a shield layer formed of a transparent plastic sheet, or may be formed of an opaque material.

Once the substrate 4 on which the electronic component is formed is fixed at a predetermined position on the back cover sheet, the core layer 13 is formed by pouring a liquid transparent resin as an adhesive, stacking the front cover sheet at a predetermined position, and adjusting and solidifying the layer to have the thickness of a card.

The display part 30 of the display device 3 is mounted in a visually recognizable manner inside the display part (window) 30 formed in the transparent front cover sheet 11.

As described above, the front cover sheet 11 is formed of a transparent material, and the surface of the sheet is shielded by a shield layer 14. The display information 30a of the display device can be seen from the window provided in the shield layer 14. Here, the front cover sheet 11 need not be transparent throughout; that is, a part from which the display part 30 can be visually recognized need only be transparent. As another modified example, the front cover sheet 11 may be formed such that the sheet excluding the display part 30 is formed of an opaque material and the part corresponding to the display part 30 is opened, into which a transparent member is fitted. When the front cover sheet 11 excluding the display part 30 is formed of the opaque material (such as a white layer), a printed layer can be directly provided onto the front cover sheet, thereby allowing the card to be manufactured without needing to provide the shield layer 14.

The display device 3 along with the battery 5, the power on/off switch 2, and the control part (not shown) are fixed onto the single substrate 4.

The substrate is fixed and positioned to the back cover sheet 12 or the like and embedded, together with an electronic component such as the aforementioned control part, the battery, and the power on/off switch, in the card by the poured transparent resin that also serves as the adhesive.

The switch 2 will be described with reference to FIG. 4.

Figure 2:
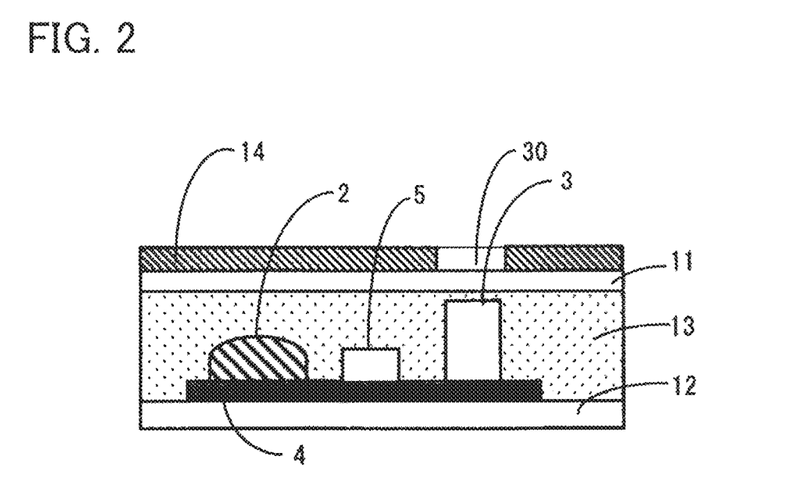
FIG. 2 is a diagram illustrating a cross section taken along line A-A in FIG. 1.
Figure 4:
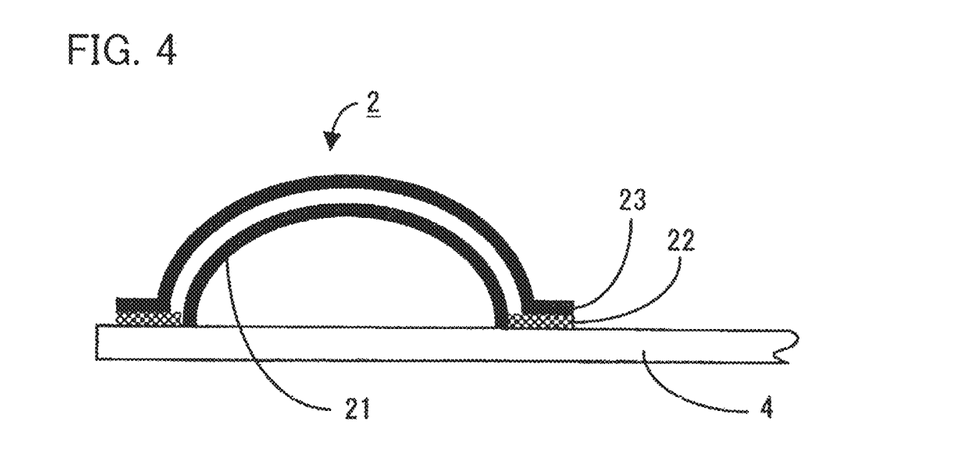
FIG. 4 is a diagram illustrating a first embodiment of a switch part according to the present invention.

FIG. 4 is an enlarged cross-sectional view of the switch 2 in FIG. 2.

The switch 2 includes, from the inner side thereof, a switch part 21 formed of a metal member, a space, and a cover member 23 formed of an insulating member.

A resin film layer 23 that is the aforementioned cover member is partially fixed to the substrate 4 by an adhesive layer 22.

Figure 5:
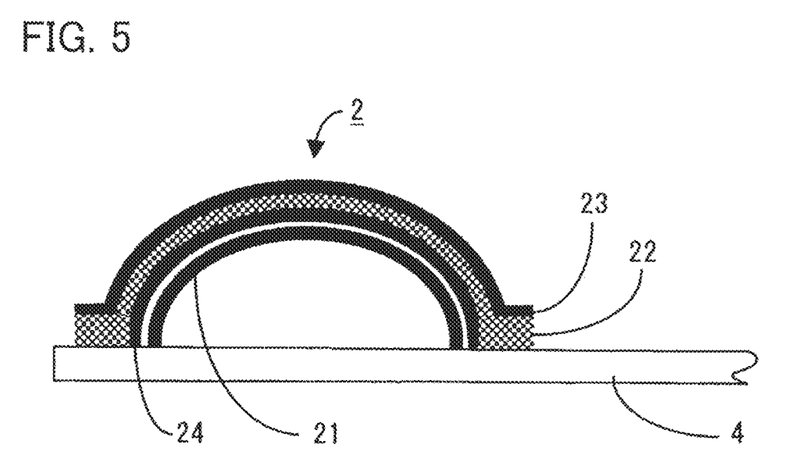
FIG. 5 is a diagram illustrating another embodiment of a switch part according to the present invention.

As illustrated in FIG. 5 (an enlarged cross-sectional view of the switch 2 in FIG. 2), the cover member includes a laminate of a second resin film layer 24, the adhesive layer 22, and the resin film layer 23 formed in order from the switch part 21 side.

The second resin film layer 24 is interposed between the adhesive layer 22 and the switch part 21, whereby the switch part 21 can be freely fixed to the substrate 4.

When the switch 2 illustrated in FIGS. 4 and 5 is depressed by a finger, the switch part 21 is temporarily recessed to be switched on. The switch part 21 is restored to the original state to be switched off when the finger leaves the switch. At this time, a moderate reaction is conveyed to the finger depressing the switch.

Every time the switch is depressed, the switch part 21 is reliably restored to the original state, thereby making possible improvement of the durability of the switch part.

The switch part and the cover member illustrated in FIGS. 4 and 5 need not have a dome shape. They may be a trapezoid, a two-stage trapezoid, or a cap with a dome-like upper part and a trapezoidal lower part, for example.

A process of manufacturing the card with a built-in electronic component of the present embodiment will be described with reference to FIG. 2.

The magnetic record part or the like, when it is to be formed in the card, is first formed in the transparent cover sheet 11 by a thermal transfer method or the like.

Next, the shield layer 14 is formed on the surface of the cover sheet 11, on which the magnetic record part is formed, by screen printing while the display part 30 is left out. The front cover sheet 11 onto which the shield layer is formed is heated and pressurized by a calender plate in order to smooth out a screen-printed ink surface.

Likewise, the shield layer is formed on the entire exposed surface of the transparent back cover sheet 12, which is then heated and pressurized by a calender plate under the same conditions as the front cover sheet.

The substrate on which the electronic component is formed is fixed to the back cover sheet 12, and thereafter an adhesive is poured to form the core layer. The front cover sheet 11 is then stacked in position, so that the whole structure is crimped by a crimping device or a pressure roller to bleed air, in which state the structure is left for a predetermined period of time until the adhesive to be the core layer is hardened. Upon confirmation that the adhesive has been hardened, the structure is die cut into a card shape.

(Material)

The material used for the card with a built-in electronic component will be described.

The electronic component with the display part, the control part, the battery, and the power on/off switch mounted on the single substrate is prepared. The display part of the display device is formed of a liquid crystal or an organic EL display body, while a paper-like lithium battery is used as the battery.

A transparent or milky plastic film having a thickness of 0.05 to 0.7 mm such as polyester, polycarbonate, polylactic acid, acryl, or polyvinyl chloride is prepared and selected as the resin film used for the laminated card.

An ultraviolet-curing offset ink or screen ink that is commercially available is used as the printing ink, for example.

A cold-setting adhesive is used as the filling adhesive.

As described above, a superior click sensation can be obtained from the card with a built-in electronic component 1 in which the dome switch within the card base can be operated comfortably from the card surface. Moreover, the adhesive layer 22 and the resin film layer 23 can retain the switch part 21 to the substrate through the second resin film layer 24. As a result, the switch part 21 can be temporarily fixed to the substrate 4 during manufacture of the card. After the card has been manufactured, the resin film layer 23 on the switch part 21 side is retained by the core layer 13 so that the switch part 21 can be securely retained on the substrate 4.

(Second Embodiment)

A second embodiment of the present invention will be described below with reference to the drawings.

In the embodiment, the direction normal to the display surface of a display part 212 will be set to a perpendicular direction Z, where a diagram looking down an electronic module 210 will be called a plan view. In the plan view, a horizontal direction and a vertical direction of the electronic module 210 or the like seen such that the display of the display part 212 is at a normal position will be called the X direction and the Y direction, respectively. Moreover, the shape in the plan view will be called a planar shape as appropriate. Note that the size of the structure in the perpendicular direction Z (the thickness direction) in each diagram will be exaggerated as appropriate for the purpose of clear illustration.

FIGS. 6A1 to 6B2 are diagrams including a plan view and a side view of the electronic module 210 as well as an external view of a card 220 according to the second embodiment.

Figure 6A:
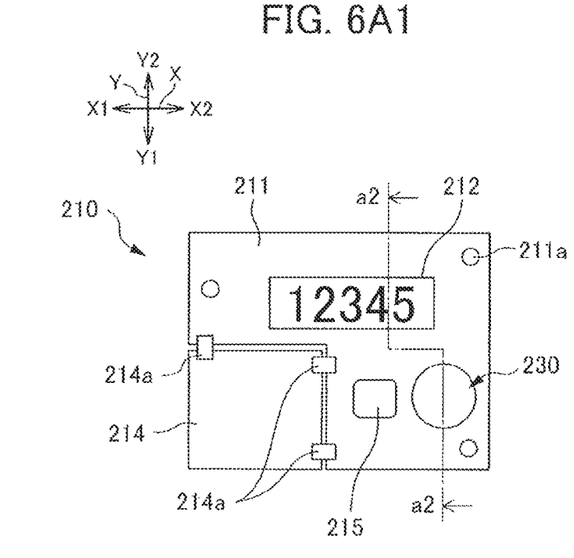
Figure 6A:
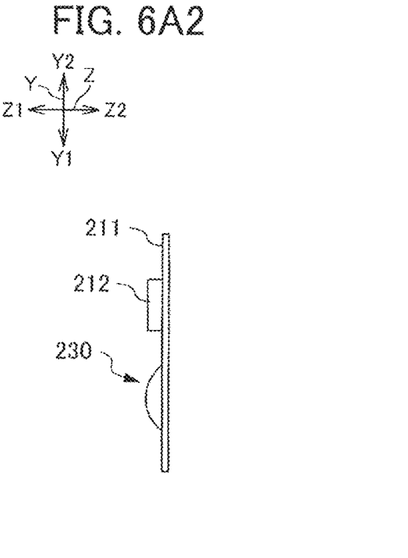

FIG. 6A1 is the plan view of the electronic module 210.

FIG. 6(a2) is a cross-sectional view of the electronic module 210 (the cross-sectional view taken along line b2-b2 in FIG. 6A1).

Figure 6B:
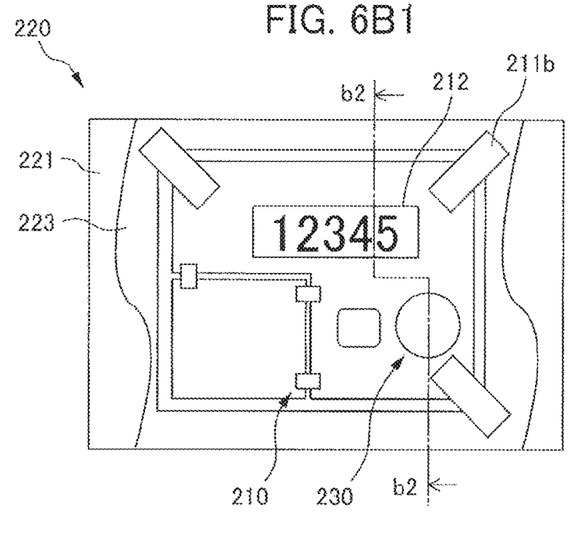

FIG. 6B1 is a plan view illustrating the internal structure of the card 220.

Figure 6B:
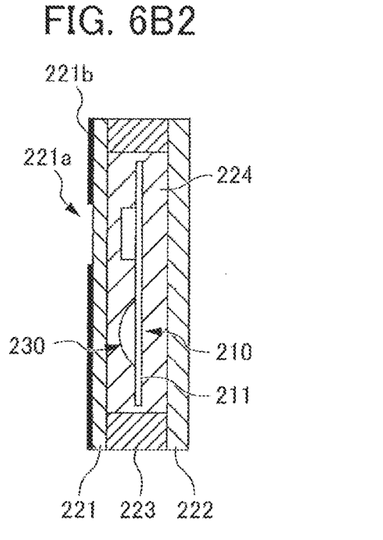

FIG. 6B2 is a cross-sectional view of the card 220 (a cross-sectional view taken along line b2-b2 in FIG. 6B1).

The electronic module 210 has the function of generating an authentication password (a so-called one-time password) every time a user uses the card 220 (the card with a built-in electronic component). Note that the electronic module 210 may be provided with a contact terminal, a loop antenna, or the like to be able to communicate with an external device (such as a card reader).

The electronic module 210 includes a module substrate 211 (an electrical substrate), the display part 212, a button 230, a battery 214, and an IC chip 215.

The module substrate 211 is a rigid or flexible printed-circuit board. In the present embodiment, the module substrate 211 is a flexible board formed of polyimide. The thickness of the module substrate 211 is approximately 100 μm, for example. The display part 212 and the button 230 are mounted to the module substrate 211, to which the battery 214 is connected and fixed as well by a connection terminal 214a.

The display part 212 serves as a display device that displays a password. The display part 212 is a liquid crystal display or an electronic paper display, for example.

The button 230 is a push button operated by a user when generating a password. The button 230 outputs operation information to the IC chip 215. The details of the button 230 will be described later.

The battery 214 supplies power to the display part 212, the IC chip 215, and the like of the electronic module 210.

The IC chip 215 serves as a control unit to control the electronic module 210. The IC chip 215 is driven by power supplied from the battery 214. The IC chip 215 includes a memory unit (not shown), in which a control program or the like that controls a process of the electronic module 210 is stored.

The operation of the electronic module 210 will be described.

When the button 230 is operated by a user, the IC chip 215 generates a password on the basis of the output from the button 230. The IC chip 215 then drives the display part 212 to display the password therein. Moreover, the IC chip 215 communicates with an external device as needed.

As illustrated in FIGS. 6B1 and 6B2, the card 220 requires authentication by use of a password in the electronic module 210 and may be a cash card from a bank or a credit card, for example.

The card 220 includes a front cover sheet 221 (an upper layer), a back cover sheet 222 (a lower layer), an intermediate substrate 223, an adhesion layer 224, and the electronic module 210.

The front cover sheet 221 is a resin sheet laminated on an upper side Z1 of the module substrate 211 to be disposed on the uppermost surface of the card 220. The front cover sheet 221 is bonded to the module substrate 211 and the top surface of the intermediate substrate 223 by the adhesion layer 224. The thickness of the front cover sheet 221 is approximately 100 to 200 μm, for example.

The front cover sheet 221 includes a window 221a.

Light is transmitted through the window 221a. The window 221a is provided at a position corresponding to the display part 212. Here, the front cover sheet 221 is formed of a transparent material. A printed layer 221b is provided on the top surface of the front cover sheet 221, except the area corresponding to the window 221a, such that the structure of the electronic module 210 or the like inside the card 220 cannot be visually discerned.

The back cover sheet 222 is a resin sheet laminated on a downside Z2 of the module substrate 211 to be disposed on the lowermost surface of the card 220. The back cover sheet 222 is bonded to the module substrate 211 and the bottom surface of the intermediate substrate 223 by the adhesion layer 224. The thickness of the back cover sheet 222 is approximately 100 to 200 μm, for example. Note that, in order for the electronic module 210 inside the card not to be visually discerned, the back cover sheet 222 is formed of a material with a tint that has concealment capability or, as is the case with the front cover sheet 221, a transparent material with a printed layer provided on the bottom surface of the back cover sheet.

The intermediate substrate 223 is disposed between the front cover sheet 221 and the back cover sheet 222. The intermediate substrate 223 is a resin sheet formed of vinyl chloride or PET, for example. The thickness of the intermediate substrate 223 is approximately 400 to 600 μm, for example. Provided in the frame interior of the intermediate substrate 223 is an aperture in which the electronic module 210 is disposed.

The structure of the button 230 will be described in detail.

Figure 7A:
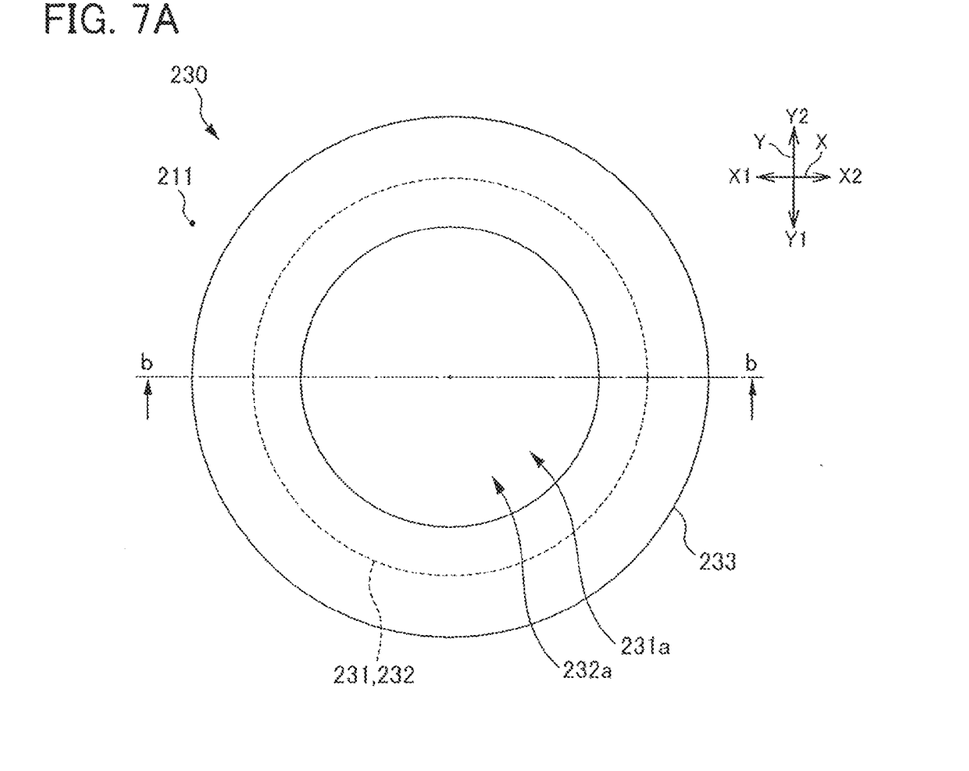
FIGS. 7A and 7B are diagrams illustrating the structure in the vicinity of a button 230 according to the second embodiment.
Figure 7B:
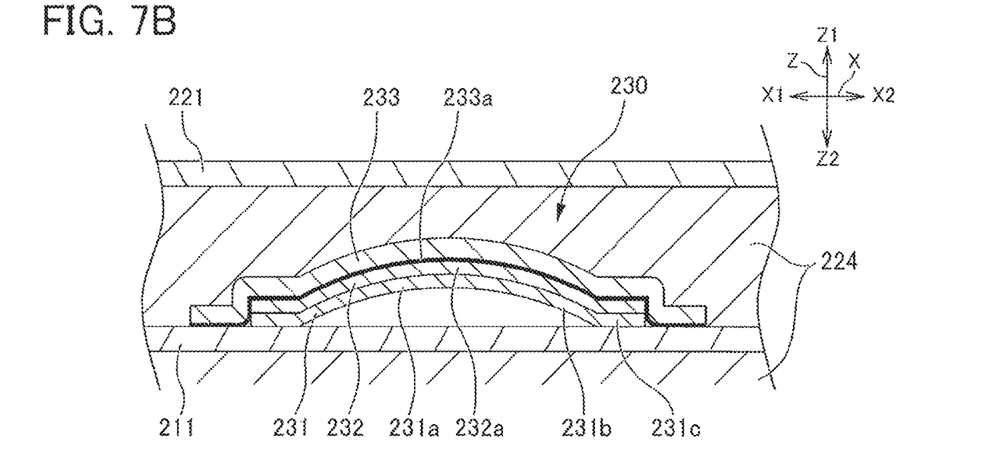

FIGS. 7A and 7B are diagrams illustrating the structure in the vicinity of the button 230 according to the second embodiment.

FIG. 7A is a plan view in the vicinity of the button 230. Note that the adhesion layer 224 is omitted from FIG. 7A in which the button 230 or the like is seen through.

FIG. 7B is a cross-sectional view in the vicinity of the button 230 (a cross-sectional view taken along line b-b in FIG. 7A).

In a plan view, the button 230 is disposed on a wiring pattern (not shown) of the module substrate 211.

The button 230 includes a dome switch 231, a cover 232, and a tape 233 (a retainer).

The dome switch 231 is what is called a metal dome switch formed of a conductive metal. The dome switch 231 is shaped such that a brim part 231c is formed all around a dome part 231b formed into a dome shape.

The dome switch 231 is disposed directly above the module substrate 211 such that the brim part 231c comes in contact with the module substrate 211. In a plan view, the substantially circular interior at the center of the dome switch 231 is a movable portion that is deformed toward the module substrate 211 side when the top surface of the substantially circular interior is pressed down (refer to FIG. 8B). The movable portion will hereinafter be referred to as a movable switch portion 231a.

Moreover, the bottom surface of the movable switch portion 231a includes an electrical contact that short-circuits the wiring pattern (not shown) of the module substrate 211 by coming into contact therewith. The movable switch portion 231a is adapted to be depressed and deformed toward the module substrate 211 side when deformed toward the module substrate 211 side by a specific stroke. Accordingly, the operating force exerted by a user in deforming the dome switch 231 can be drastically reduced. The dome switch 231 can thus provide the user with a click sensation, that is, the sensation of pressing a button.

The cover 232 is shaped to cover the dome switch 231. The cover 232 is superposed on the dome switch 231. The cover 232 is retained on the module substrate 211 by the tape 233. The dome switch 231 is retained on the module substrate 211 as a result. In a plan view, the substantially circular interior at the center of the cover 232 is a movable portion that is deformed toward the module substrate 211 side when the top surface of the substantially circular interior is pressed down (refer to FIG. 8B). The movable portion will hereinafter be referred to as a movable cover portion 232a.

Note that in the embodiment, the cover 232 is formed of a member identical to that of the dome switch 231. This means that the cover 232 and the dome switch 231 are a common part in which two pieces of the dome switch 231 are placed on top of each other. The cover 232 and the dome switch 231 are therefore disposed while tightly adhering to each other.

The tape 233 includes an adhesive material 233a, which retains the cover 232 on the module substrate 211. The tape 233 has a circular planar shape that is larger than the cover 232. The area of the tape 233 in contact with the module substrate 211 is larger than that of the cover 232, thereby allowing the cover 232 to be retained on the module substrate 211.

Note that the planar shape of the tape 233 is not limited as long as the cover 232 can be retained to the module substrate 211. The planar shape may be a rectangle covering the cover 232, for example.

The tape 233 may also be formed such that a part of the cover 232 is exposed out of the tape 233. In this case, the tape 233 may have a toric planar shape, for example. When the tape has the toric planar shape, the inner circumference of the toric tape need be smaller than the cover 232, while the outer circumference of the toric tape need be larger than the cover 232. The tape 233 may also have a rectangular planar shape that cuts across the cover 232, for example.

Each interlaminar structure of the button 230 will be described.

The dome switch 231 is not bonded to the cover 232 by an adhesive material or the like.

On the other hand, the cover 232 is bonded to the tape 233 by the adhesive material 233a as described above.

The tape 233 is bonded to the adhesion layer 224 when formed in the card 220. When a part of the cover 232 is exposed out of the tape 233, the cover 232 and the tape 233 are bonded to the adhesion layer 224.

The top surface of the movable switch portion 231a is therefore not bonded to the adhesion layer 224. Moreover, a void 231d (refer to FIG. 8A) is provided between the bottom surface of the movable switch portion 231a and the module substrate 211. As a result, the movable switch portion 231a is freely deformed toward the module substrate 211 side with no relation to the adhesion layer 224. This means that the movable switch portion 231a is unrestrained by the adhesion layer 224 and the movable cover portion 232a.

Figure 8A:
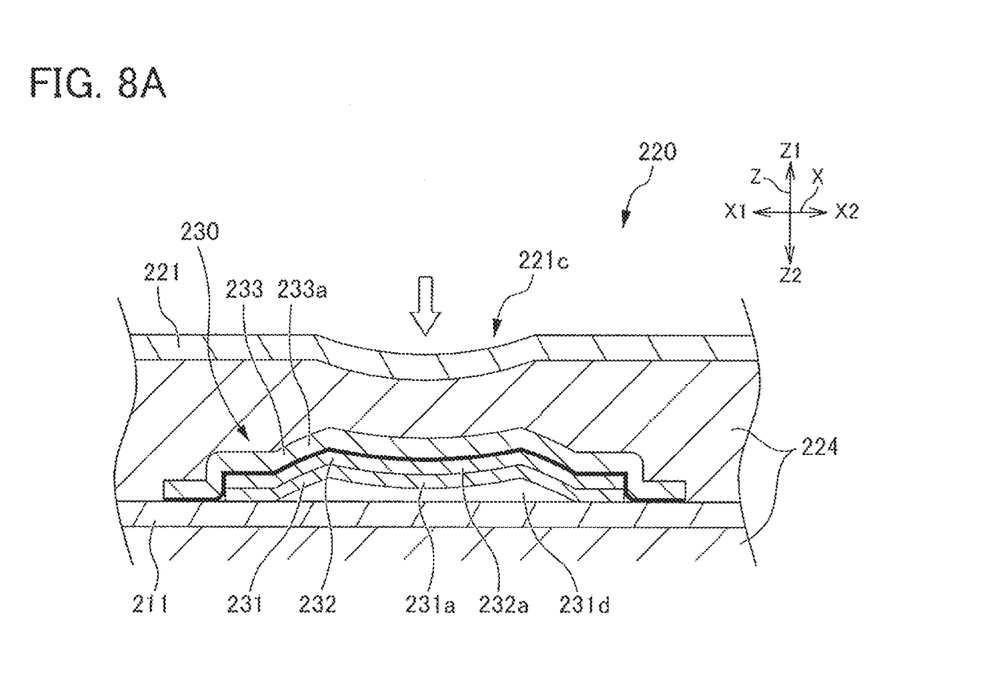
FIGS. 8A and 8B are cross-sectional views illustrating the operation of the button 230 according to the second embodiment.
Figure 8B:
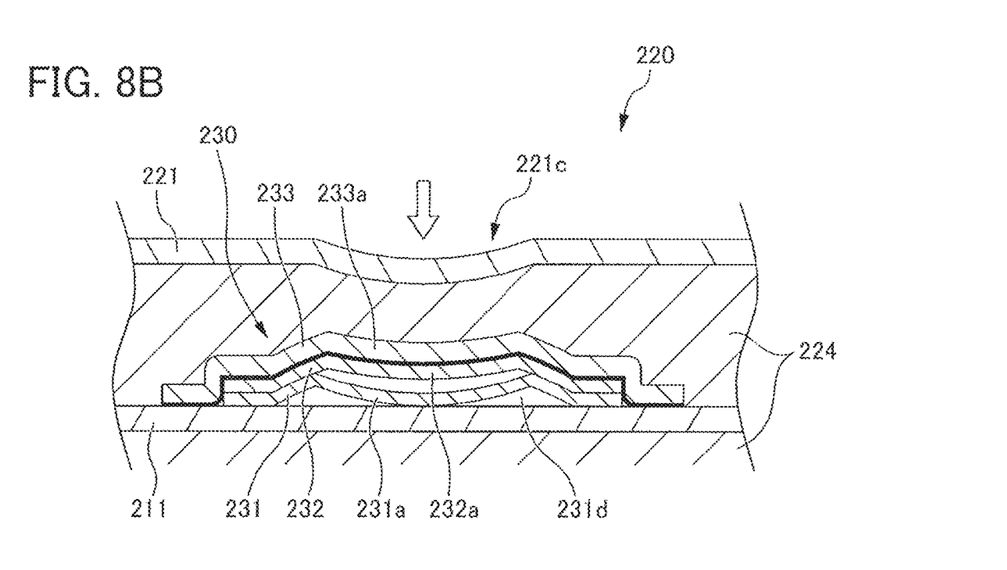

FIGS. 8A and 8B are cross-sectional views illustrating the operation of the button 230 according to the second embodiment.

FIG. 8A is a cross-sectional view where the front cover sheet 221, the adhesion layer 224, the tape 233, the cover 232, and the dome switch 231 are deformed when a button corresponding area 221c on the top surface of the card 220 (the front cover sheet 221) is pressed down.

FIG. 8B is a cross-sectional view where the dome switch 231 is deformed by itself, namely, where the button is clicked.

As illustrated in FIG. 8A, the void 231d is provided between the dome switch 231 and the module substrate 211. When the button corresponding area 221c is pressed by a user's finger, each member is deformed to make the void 231d smaller. That is, the adhesion layer 224, the tape 233, and the movable cover portion 232a are deformed toward the module substrate 211 side. Consequently, the movable switch portion 231a is deformed toward the module substrate 211 side. The movable switch portion 231a is thus deformed through the adhesion layer 224, the tape 233, and the cover 232.

As described above, the movable switch portion 231a is freely deformed toward the module substrate 211 side.

As illustrated in FIG. 8B, the movable switch portion 231a can thus be deformed by itself with no relation to the adhesion layer 224 or the like when the movable switch portion is deformed by a stroke equivalent to a specific set value. Therefore, the dome switch 231 can be deformed in accordance with the setting to provide a user's finger with a superior click sensation. Durability according to the setting can also be obtained by deforming the movable switch portion 231a of the dome switch 231 in accordance with the setting.

On the other hand, the movable cover portion 232a bonded to the adhesion layer 224 through the tape 233 is less likely to be deformed by itself even when deformed by a stroke equivalent to the specific set value, because the movable cover portion is pulled toward the adhesion layer 224 side. Therefore, the cover 232 alone without the dome switch 231 cannot provide a user with the superior click sensation of the button 230. That is, the button 230 is configured to provide a user with the superior click sensation by disposing the movable switch portion 231a in an unrestrained manner on the module substrate 211 side relative to the cover 232.

Once the user thereafter weakens the operating force of the finger or the finger leaves the button corresponding area 221c, the button is restored to the original state (the state illustrated in FIG. 7A) by the spring characteristic of the dome switch 231 and the cover 232.

A method of manufacturing the card 220 according to the present embodiment will now be described.

The card 220 is manufactured in accordance with the following process. The method of manufacturing a single card 220 will be described below for simplicity. In the actual method, however, a plurality of cards is manufactured from one substrate.

(1) As illustrated in FIGS. 6A and 7B, a manufacturing machine is used to dispose the dome switch 231 on the module substrate 211. Here, the manufacturing machine identifies a positioning hole 211a provided on the module substrate 211 by a sensor so that the dome switch 231 is positioned on the module substrate 211.

(2) Similar to (1), the manufacturing machine is used to dispose the cover 232 and the tape 233 on the dome switch 231 as well as bond the outer periphery of the tape 233 to the module substrate 211. As a result, the dome switch 231 is retained on the module substrate 211.

Accordingly, an assembly including the module substrate 211, the dome switch 231, the cover 232, and the tape 233 is manufactured.

The cover 232 and the tape 233 may be bonded in advance in order to simplify the manufacturing work.

(3) As illustrated in FIG. 6B1, the electronic module 210 is temporarily fixed to the intermediate substrate 223 by using a tape 211b.

(4) As illustrated in FIG. 6B2, the space among the front cover sheet 221, the electronic module 210, and the intermediate substrate 223 is filled with the adhesive material to be formed in the adhesion layer 224, while the space among the back cover sheet 222, the electronic module 210, and the intermediate substrate 223 is likewise filled with the adhesive material.

(5) The top surface of the front cover sheet 221 as well as the bottom surface of the back cover sheet 222 are pressurized by a roller so that the card 220 has a predetermined thickness and excess adhesive material is discharged to the outside.

Note that the dome switch 231 is retained to the module substrate 211 by the tape 233 in the process described in (2), whereby misalignment of the dome switch on the module substrate 211 can be controlled when the adhesive material is being filled and the card is being pressurized.

(6) The adhesive material is fixed tightly after pressurization. The tape 233 is thus securely bonded to the adhesion layer 224 after the card has been manufactured. As a result, misalignment of the dome switch 231 with respect to the module substrate 211 can be controlled. When the cover 232 is exposed out of the tape 233, the cover 232 and the tape 233 are bonded to the adhesion layer 224.

The card 220 can be manufactured by following the aforementioned process.

As described above, the card 220 according to the present embodiment, in which the dome switch 231 is deformed in accordance with the setting, can exhibit a desired performance such as the click sensation. The dome switch 231 can also be temporarily fixed to the module substrate 211 during manufacture of the card. On the other hand, misalignment of the dome switch 231 with respect to the module substrate 211 can be controlled after the card has been manufactured. Furthermore, the number of types of the component can be reduced since the cover 232 and the dome switch 231 are common, thereby facilitating the management of the component at the time of manufacturing or the like.

What has been described in the present embodiment where the cover 232 and the dome switch 231 are the common part is merely an example. That is, the cover may also be formed of a paper material or resin sheet member that is molded into the same shape as the dome switch 231. The operating pressure on the cover can be reduced in this case. As a result, the operating force of a user is easily conveyed to the dome switch 231, thereby allowing the operating force to near the set value.

(Third Embodiment)

A third embodiment of the present invention will now be described.

Note that a part in the following description and drawings performing the same function as what is described in the second embodiment will be assigned the same reference numeral or a reference numeral with the same last two digits as those in the aforementioned embodiment, so that the redundant description will be omitted as appropriate.

Figure 9A:
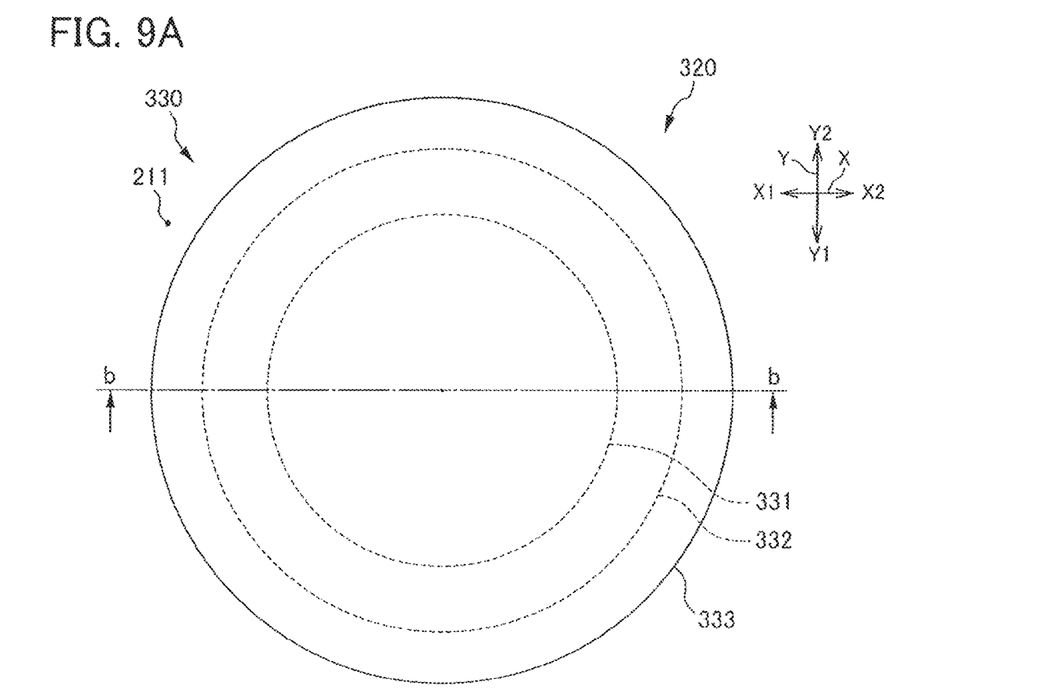
FIGS. 9A and 9B are diagrams illustrating the structure in the vicinity of a button 330 according to a third embodiment.
Figure 9B:
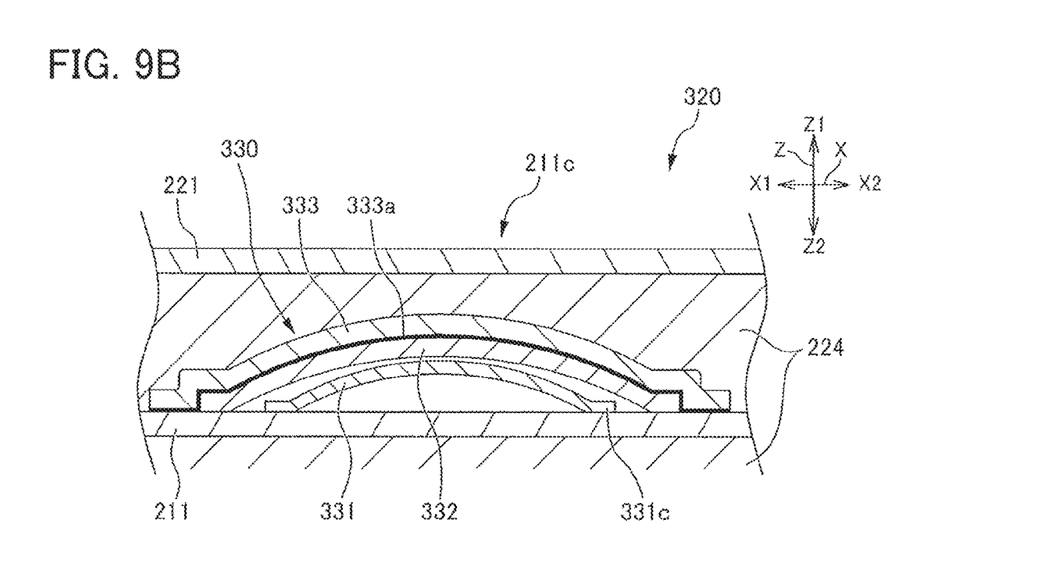

FIGS. 9A and 9B are diagrams illustrating the structure in the vicinity of a button 330 according to the third embodiment.

FIG. 9A is a plan view in the vicinity of the button 330 (a diagram corresponding to FIG. 7A).

FIG. 9B is a cross-sectional view in the vicinity of the button 330 (a cross-sectional view taken along line b-b in FIG. 9A).

A dome switch 331 is a size smaller than a cover 332 and is housed therein while having a gap between the dome switch and the cover 332.

The cover 332 may be a metal dome switch that is a size larger than the dome switch 331 or may be formed of a dome-shaped resin or the like. The cover 332 is retained to a module substrate 211 by using a tape 333 as with the second embodiment.

The button 330 is configured as described above where the dome switch 331 is disposed on the module substrate 211.

Here, it is required that the dome switch 331 have small play inside the cover 332 in order to maintain a moderate positional relationship with a button corresponding area 221c on the top surface of a card 320 (a front cover sheet 221) and with a wiring pattern (not shown) on the module substrate 211. Accordingly, it is preferred that the diameter of the cover 332 be up to about twice the diameter of the dome switch 331 in the planar shape (the diameter of the cover 332 is from 8 to approximately 16 mm when the diameter of the dome switch 331 is 8 mm, for example).

In the button 330 according to the present embodiment, the dome switch 331 is housed inside the cover 332 while having a gap between the dome switch and the cover. This can therefore allow a brim part 331c of the dome switch 331 to be disposed on the module substrate 211 in an unrestrained manner.

Note that the dome switch 331 housed inside the cover 332 in an unrestrained manner in the present embodiment has been illustrated merely as an example. That is, the dome switch 331 may also be mounted to the module substrate 211. In this case, for example, the dome switch 331 can be mounted to the module substrate 211 by applying cream solder to the module substrate 211, disposing the dome switch 331 with a chip mounter or the like, and thereafter performing a reflow process. The dome switch 331 is housed inside the cover 332 with no play and can thus maintain more reliably the positional relationship with the button corresponding area 221c on the top surface of the card 320 and with the wiring pattern on the module substrate 211. This configuration is suitable for the case where the brim part 331c of the dome switch 331 is fixed to the module substrate 211.

(Fourth Embodiment)

A fourth embodiment of the present invention will now be described.

Figure 10A:
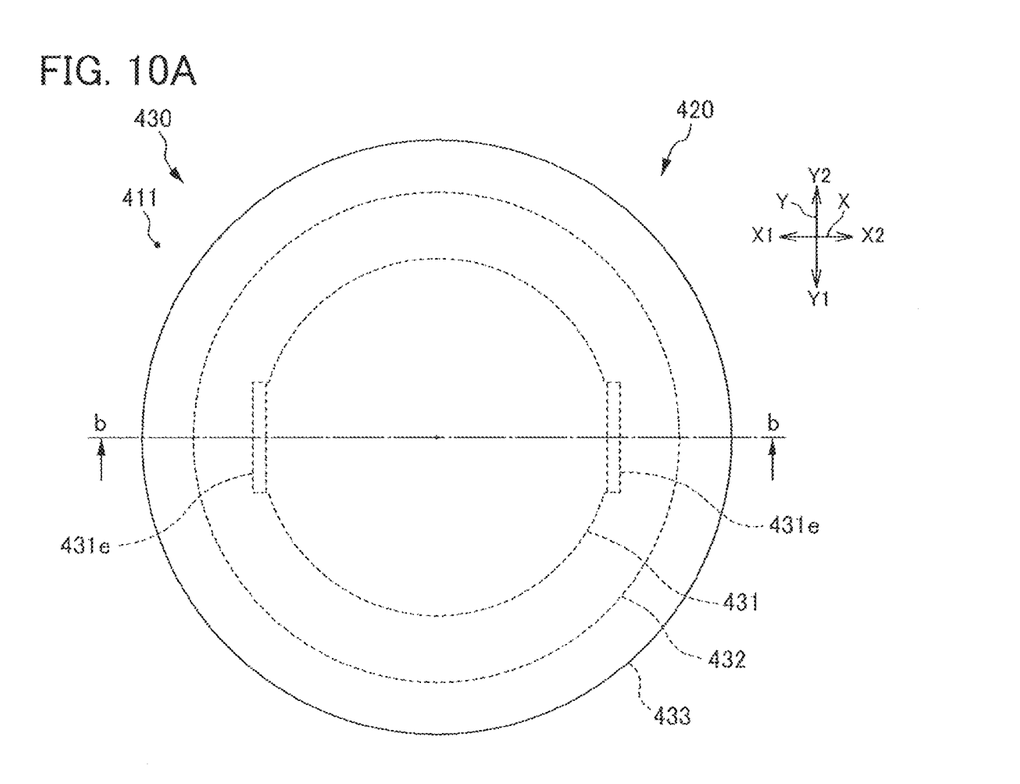
FIGS. 10A and 10B are diagrams illustrating the structure in the vicinity of a button 430 according to a fourth embodiment.
Figure 10B:
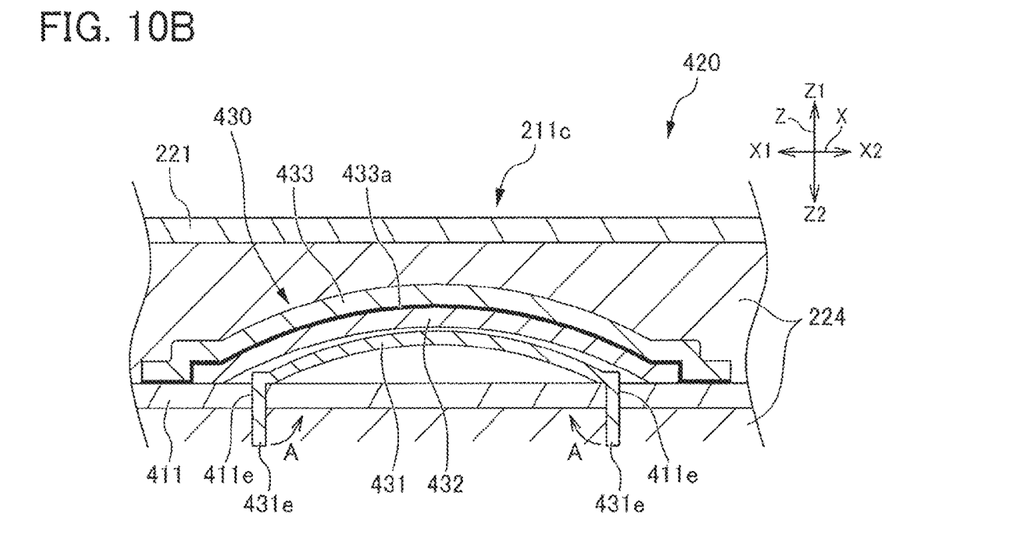

FIGS. 10A and 10B are diagrams illustrating the structure in the vicinity of a button 430 according to the fourth embodiment.

FIG. 10A is a plan view in the vicinity of the button 430 (a diagram corresponding to FIG. 7A).

FIG. 10B is a cross-sectional view in the vicinity of the button 430 (a cross-sectional view taken along line b-b in FIG. 10A).

A dome switch 431, a cover 432, and a tape 433 of the button 430 are configured substantially similarly to those in the third embodiment except that two legs 431e are provided to the dome switch 431 in the present embodiment.

The two legs 431e are disposed facing each other in the outer peripheral part of the dome switch 431. The leg 431e is projected toward a downside Z2 (toward a module substrate 411) from the outer peripheral part of the dome switch 431. The leg 431e is inserted through an aperture 411e in the module substrate 411 and projected from the bottom surface of the module substrate 411 to the downside Z2. The leg 431e is fixed onto the module substrate 411 when an adhesive material is tightly fixed to form an adhesion layer 224.

In manufacturing the card, the leg 431e of the dome switch 431 is inserted through the aperture 411e of the module substrate 411, followed by filling of the adhesive material that forms the adhesion layer 224. The leg 431e in this case is inserted through the aperture 411e, whereby misalignment of the dome switch 431 with respect to the module substrate 411 can be controlled. In the case where misalignment results from the dome switch 431 rising up from the module substrate 411, the rise can be prevented by bending the leg 431e (refer to arrow A) or soldering the leg 431e to the module substrate 411.

In the aforementioned configuration, the dome switch 431 is housed inside the cover 432 with no play and can thus maintain the positional relationship with a button corresponding area 221c on the top surface of a card 420 and with a wiring pattern on the module substrate 411 in a more reliable manner.

(Fifth Embodiment)

A fifth embodiment of the present invention will now be described.

Figure 11A:
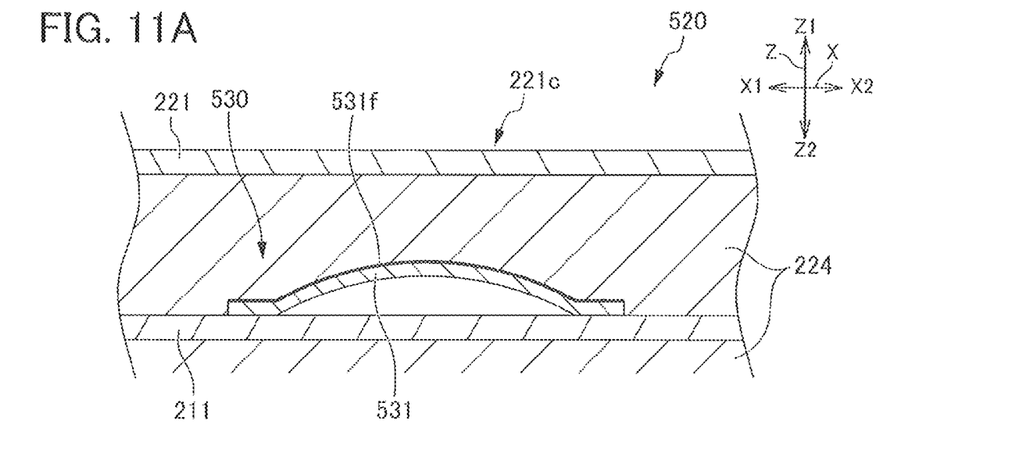
FIGS. 11A to 11C are cross-sectional views in the vicinity of a button 530 according to a fifth embodiment.
Figure 11B:
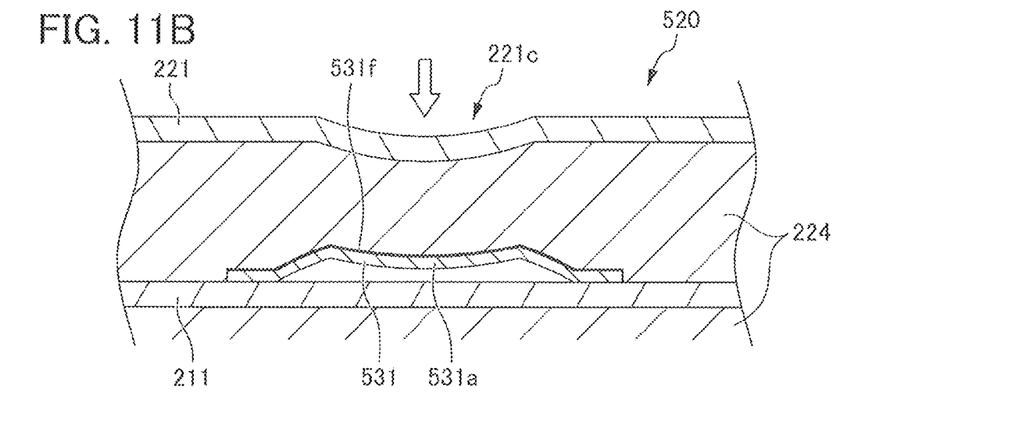
Figure 11C:
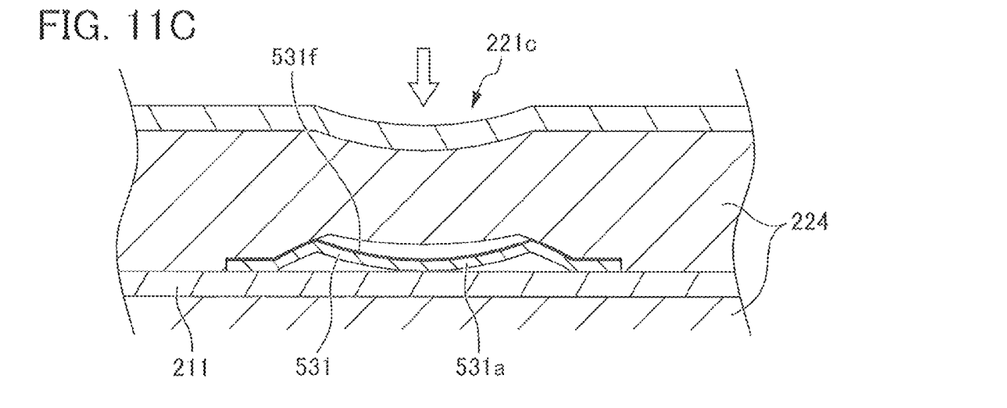

FIGS. 11A to 11C are cross-sectional views in the vicinity of a button 530 according to a fifth embodiment.

FIG. 11A is a cross-sectional view in which a button corresponding area 221c is not depressed.

FIGS. 11B and 11C are cross-sectional views in which the button corresponding area 221c is depressed.

A dome switch 531 is a member similar to what is used in the second embodiment but is different therefrom in that a resin layer 5311 is coated on the top surface of the dome switch.

The resin layer 531f of the dome switch 531 is formed of a material (such as silicon or fluororesin) that does not bond easily to an adhesion layer 224.

The dome switch 531 is housed in a card 520 as is, without a cover or the like. The resin layer 531f is thus brought into direct contact with the adhesion layer 224 after the card has been manufactured. As a result, the dome switch 531 is retained while surrounded by the resin layer 531f and positioned onto a module substrate 211.

In order to control the misalignment between the dome switch 531 and the module substrate 211 at the time of manufacturing, the dome switch 531 may be mounted to the module substrate 211 as described in the third embodiment or, as described in the fourth embodiment, the dome switch 531 may be provided with a leg that is inserted through an aperture of the module substrate 211.

As illustrated in FIG. 11B, the adhesion layer 224 and a movable switch portion 531a are deformed toward the module substrate 211 side when the button corresponding area 221c is depressed by a user's finger.

Now, as illustrated in FIG. 8B, the movable switch portion 531a is deformed by itself once deformed by a stroke equivalent to a specific set value, regardless of the deformation of the adhesion layer 224 or the like. This is because the resin layer 531f formed of a material that does not bond easily to the adhesion layer 224 as described above is not bonded to the adhesion layer 224 but comes off the contact surface formed between the resin layer 5311 and the adhesion layer 224. If the resin layer 531f is somewhat bonded to the adhesion layer 224 after the card has been manufactured, the resin layer 531f can come off the adhesion layer 224 as a result of repeated operation of the button 530.

When a user subsequently weakens the operating force of a finger or the finger leaves the button corresponding area 221c, the button is restored to the original state (the state illustrated in FIG. 11A) by the spring characteristic of the dome switch 531.

As a result, the dome switch 531 is deformed by an operating force closer to the set value, thereby allowing the user's finger to feel a superior click sensation.

As has been described, the card 520 according to the present embodiment can obtain performance closer to the setting by operating the dome switch 531 with an operating force closer to the set value. The simple construction can also allow the card to be made thinner and the cost to be reduced.

Note that the resin layer 5311 not bonding easily to the adhesion layer 224 in the present embodiment is illustrated merely as an example. That is, for example, the resin layer 531f and the adhesion layer 224 may be bonded to each other as long as the dome switch 531 and the resin layer 531f come off easily. When the bonding strength of the resin layer 531f is just enough to temporarily fix the resin layer 531f to the dome switch 531 at the time of manufacturing, the resin layer 531f and the dome switch 531 easily come, off each other when the card is used. In this case, the aforementioned effect can be obtained regardless of the compatibility of adhesive property between the resin layer 531f and the adhesion layer 224.

While the embodiments of the present invention have been described, the present invention is not to be limited to the aforementioned embodiments. That is, various modifications and changes can be made as will be described below in a modified embodiment, where these modifications and changes are also included within the technical scope of the present invention. The effects described in the embodiments merely include the most preferable effects obtained by the present invention, where the effects of the present invention are not to be limited to what has been described in the embodiments. Although the detailed description will be omitted, the aforementioned embodiments and the modified embodiment to be described below may be combined as appropriate.

(Modified Embodiment)

The dome switch is not limited to the metal dome switch as described in the example of the aforementioned embodiment. For example, the dome switch may be what is called a polydome, in which an electrical contact formed of carbon is provided to a dome-shaped resin. A cost reduction can be achieved in this case.

The invention claimed is:

1. A card with built-in electronic components, comprising:
an electrical substrate on which electronic components are disposed;
   an upper layer laminated above the electrical substrate;
   an adhesion layer which bonds the electrical substrate and the upper layer together; and
   a dome switch which is disposed on the electrical substrate and has an electrical contact facing the electrical substrate, the dome switch being configured to cause the card to be in operation when a top surface of the card depressed by a user causes a movable switch portion to deform toward the electrical substrate, such that the electrical contact comes into contact with the electrical substrate, wherein
   the electrical substrate on which the dome switch is disposed is built in the adhesion layer,
   no top surface of the dome switch is bonded to the adhesion layer, and the movable switch portion is deformable from the adhesion layer toward the electrical substrate.

2. The card with built-in electronic components according to claim 1, further comprising:
   a cover, which is configured to be in a shape to cover the dome switch and arranged to overlap with the dome switch, includes a movable cover portion that is deformable toward the electrical substrate when the top surface of the card is depressed by a user; and
   a retainer configured to retain the cover on the electrical substrate, wherein
   at least part of each of the cover and the retainer is bonded to the adhesion layer, and
   the movable switch portion is not bonded to the movable cover portion so that the movable switch portion is deformable from the movable cover portion toward the electrical substrate.

3. The card with built-in electronic components according to claim 2, wherein
   the cover and the dome switch each comprise a common part and are configured such that two pieces of the dome switch are placed on top of each other.

4. An assembly which is incorporated into a card with built-in electronic components, the assembly comprising:
   an electrical substrate on which electronic components are disposed;
   a dome switch which is disposed on the electrical substrate and has an electrical contact facing the electrical substrate, the dome switch being configured to cause the card to be in operation when a top surface of a front cover sheet of the card depressed by a user causes a movable switch portion to deform toward the electrical substrate, such that the electrical contact comes into contact with the electrical substrate;
   a cover, which is configured to be in a shape to cover the dome switch and arranged to overlap with the dome switch below the front cover sheet, includes a movable cover portion that is deformable toward the electrical substrate when the top surface of the front cover sheet of the card is depressed by a user; and
   a retainer configured to retain the cover on the electrical substrate, wherein
   the movable switch portion is not bonded to the movable cover portion so that the movable switch portion is deformable from the movable cover portion toward the electrical substrate.

* * * * *